United States Patent
Day

(10) Patent No.: US 11,161,082 B1
(45) Date of Patent: Nov. 2, 2021

(54) STAND MIXER FUNNEL ACCESSORY

(71) Applicant: Donald E Day, Butler, PA (US)

(72) Inventor: Donald E Day, Butler, PA (US)

(*) Notice: Subject to any disclaimer, the term of this patent is extended or adjusted under 35 U.S.C. 154(b) by 211 days.

(21) Appl. No.: 16/719,067

(22) Filed: Dec. 18, 2019

(51) Int. Cl.
  *B01F 15/02* (2006.01)
  *B67C 11/00* (2006.01)
  *B01F 7/16* (2006.01)

(52) U.S. Cl.
  CPC .......... *B01F 15/0235* (2013.01); *B67C 11/00* (2013.01); *B01F 7/16* (2013.01)

(58) Field of Classification Search
  CPC ......... B67C 11/00; B01F 7/16; B01F 15/0235
  USPC .......... 222/113; 141/331–335, 340; 385/147
  See application file for complete search history.

(56) References Cited

U.S. PATENT DOCUMENTS

| | | | | |
|---|---|---|---|---|
| 501,649 A * | 7/1893 | Fitch | ............... | B01F 13/1055 366/150.1 |
| 1,399,916 A * | 12/1921 | Aronson | ............... | B65D 47/18 222/420 |
| 1,558,844 A * | 10/1925 | Cronin | ............... | A47J 43/1062 366/129 |
| 1,695,053 A * | 12/1928 | Milligan | ............... | B67C 11/02 141/94 |
| 2,042,928 A * | 6/1936 | Da Costa | ............... | A47J 31/46 222/133 |
| 2,074,162 A * | 3/1937 | Bowman | ............... | A21C 1/14 209/251 |
| 2,200,642 A * | 5/1940 | Shell | ............... | B67C 11/02 222/51 |
| 2,537,852 A * | 1/1951 | Peterson | ............... | A47J 43/07 209/355 |
| 2,580,811 A * | 1/1952 | Martinsen | ............... | B65D 25/48 222/460 |
| 2,650,741 A * | 9/1953 | Van Guilder | ............... | A47J 43/044 141/363 |
| 2,710,098 A * | 6/1955 | Tilton | ............... | A47J 44/02 209/358 |
| 3,771,578 A * | 11/1973 | Huff | ............... | B65B 67/12 141/314 |
| 4,217,941 A * | 8/1980 | Catalano | ............... | B65G 65/24 141/319 |
| 4,648,153 A * | 3/1987 | Coroneos | ............... | A22C 7/00 425/382 R |
| 4,811,870 A * | 3/1989 | Bianco | ............... | B65D 25/2894 222/461 |

(Continued)

OTHER PUBLICATIONS

Amazon webpage for existing KitchenAid Stand Mixer funnel product https://amazon.com/KitchenAid-KN256PS-1-Piece-Pouring-Shield/dp/B0000CFF38.

(Continued)

*Primary Examiner* — Tony G Soohoo
(74) *Attorney, Agent, or Firm* — Karen Tang-Wai Sutton

(57) ABSTRACT

A funnel accessory for a KitchenAid® brand stand mixer with a hub protruding from its motor head. The funnel accessory has a funnel, with a top opening relatively larger than a bottom opening, affixed to a mount having a hub receiving opening oriented so as to be perpendicular to the top opening of the funnel. The mount is formed with a slot sized to receive a thumb screw of the hub; pushing the mount over an external wall of the hub while aligning the slot to receive the thumb screw couples the funnel accessory to the hub.

7 Claims, 6 Drawing Sheets

(56) References Cited

U.S. PATENT DOCUMENTS

| | | | | |
|---|---|---|---|---|
| 5,607,004 A * | 3/1997 | Cope | ............... | B67C 11/00 |
| | | | | 141/331 |
| 5,655,580 A * | 8/1997 | Schrock | ............... | B65B 3/06 |
| | | | | 141/332 |
| 5,758,804 A * | 6/1998 | Wirth | ............... | B65D 25/48 |
| | | | | 222/460 |
| D407,643 S * | 4/1999 | Wirth | ............... | D9/447 |
| 7,614,779 B2 * | 11/2009 | Ta | ............... | A47J 43/044 |
| | | | | 366/197 |
| 7,677,276 B2 * | 3/2010 | Sun | ............... | B67C 11/02 |
| | | | | 141/332 |
| 7,740,400 B2 * | 6/2010 | Membreno | ............... | B01F 7/1605 |
| | | | | 366/182.4 |
| 7,882,734 B2 * | 2/2011 | Ciancimino | ............... | B01F 15/00201 |
| | | | | 73/169 |
| 9,675,101 B2 * | 6/2017 | Conti | ............... | A47J 43/06 |
| 9,782,041 B2 * | 10/2017 | Baker | ............... | B01F 15/00155 |
| D848,214 S * | 5/2019 | Fung | ............... | D7/412 |
| 10,433,577 B2 * | 10/2019 | Benoit | ............... | A47J 19/02 |
| 10,751,897 B2 * | 8/2020 | Fung | ............... | B26D 1/0006 |
| 10,827,881 B2 * | 11/2020 | DeVito | ............... | B07B 1/06 |
| 11,084,613 B1 * | 8/2021 | Dove | ............... | B65B 39/007 |
| 2008/0053566 A1 * | 3/2008 | England | ............... | B67C 11/02 |
| | | | | 141/331 |
| 2009/0188583 A1 * | 7/2009 | Noel | ............... | B67C 11/00 |
| | | | | 141/391 |
| 2010/0084042 A1 * | 4/2010 | Bonnell | ............... | B67C 9/00 |
| | | | | 141/1 |
| 2012/0097809 A1 * | 4/2012 | Carlson | ............... | B67C 11/00 |
| | | | | 248/125.8 |
| 2014/0102951 A1 * | 4/2014 | Riha | ............... | B07B 1/00 |
| | | | | 209/233 |
| 2015/0014227 A1 * | 1/2015 | Riha, IV | ............... | A47J 43/0705 |
| | | | | 209/236 |
| 2017/0135526 A1 * | 5/2017 | Conti | ............... | A47J 19/027 |

OTHER PUBLICATIONS

New Metro Design Pouring Chute https://www.newmetrodesign.com/content/Pouring-Chute.html.

* cited by examiner

STAND MIXER FUNNEL ACCESSORY

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

(1) Field of the Invention

The present invention pertains to the field of kitchen appliances, and specifically to accessories for stand mixers used to add ingredients to stand mixing bowls.

(2) Background Art

Stand mixers are a kitchen workhorse appliance. The mixer allows a cook to conveniently, simultaneously, and continuously mix and introduce ingredients in the mixer bowl without the need to manually hold the mixer or stop mixing while introducing ingredients. The motor head of the mixer is designed to removably receive many useful attachments such wire beaters, dough hooks and scrapers, which when the tilting motor head is in its horizontal position, the attachments are directly positioned in a center of the mixing bowl.

A popular stand mixer made by the Whirlpool Corporation of Benton Harbor, Mich., sold under the Kitchen Aid® brand name additionally features an attachment hub on the front of the motor head that allows a variety of useful attachments, such as meat grinders, to be directly affixed to the hub and thus use the mixer's motor. Hence, the Kitchen Aid® brand of stand mixers features two accessory attachment mounts perpendicular to one another. Accessories accessing the motor via the hub are secured with a threaded thumb screw that fits into a hole formed into the hub that when turned applies pressure to the attachment's shaft to secure the attachment to the hub.

One known problem with all stand mixers is that the motor head, while tiltable to allow easy access to the bowl and also to allow the various mixing accessories used in the bowl to be attached to or detached from the motor head, is bulky and when in mixing position tends to block the cook's access to the bowl's interior; to effectively mix contents in the bowl, the bowl must be sized small enough so as to allow the mixing accessories adequate access to the interior sides of the bowl. A large bowl that allows ample access to the bowl's interior via the top opening cannot be used because it would tend to hinder proper mixing, and the pedestal of the mixer is designed to limit the bowl size so as to optimize mixing of the bowl's contents. The bulky motor head forces the cook to add ingredients to the bowl via a relatively narrow space between the upper bowl lip and the side of the motor head, and this results in many spills. Flour is particularly difficult to neatly add to a stand mixer bowl while the beaters are turning; it is difficult to pour a cup of flour into the bowl because the motor head is in the way, and messy and time consuming to spoon flour into the relatively small access space. Loss of flour via accidental spills makes it impossible to measure and accurately add ingredients, and inaccurate ingredient measurements can negatively affect the final cooked product.

Kitchen Aid® has attempted to remedy the problem of neatly and accurately adding ingredients to the running mixer by developing a pouring shield that covers the space between the motor head and the bowl rim, with a side funnel having walls extending upwards and outwards so as to create an ingredient chute. While creative, this pouring shield has many drawbacks: sitting the bowl rim, it is easily dislodged, and there are many complaints that when the mixer is running, ingredients poured down the chute have a tendency to come back up the chute and make a mess of the mixing attachments and the underside of the motor head. The pouring shield must be removed every time the cook wants to access the beater or otherwise tilt the motor head upwards, and a messy shield now has an opportunity to create a further mess on a countertop. Some cooks attempt to more efficiently and neatly add ingredients by holding funnels just inside the bowl's rim, but this is inconvenient and impossible when large or heavy quantities of flour, sugar or liquids are poured out of large containers into the funnel and require both of the cook's hands to support the container. Holding a funnel while pouring ingredients also makes it impossible for the cook to modulate the mixer speed while continuously running the mixer.

What is needed is a funnel attachment that easily and securely attaches to the motor head without requiring modification of the stand mixer, allows the neat and precise addition of ingredients to the mixing bowl, does not interfere with any of the mixer's OEM attachments, and still allows the motor head to tilt and otherwise function without requiring the funnel attachment to be removed from the motor head.

DISCLOSURE OF INVENTION

A funnel accessory for a stand mixer comprising a funnel having a top opening and a bottom opening affixed to a mount having a hub-receiving opening sized and shaped to mate with an exterior wall shape of hub of the stand mixer. The mount is oriented on the funnel such that when the funnel accessory is attached to the hub, the bottom opening is positioned just below a lip of a mixing bowl regardless of a position of a motor head of the stand mixer to ensure the funnel does not interfere with the functioning of the stand mixer. The mount is further formed with a slot sized and shaped to receive a thumb screw of the stand mixer.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
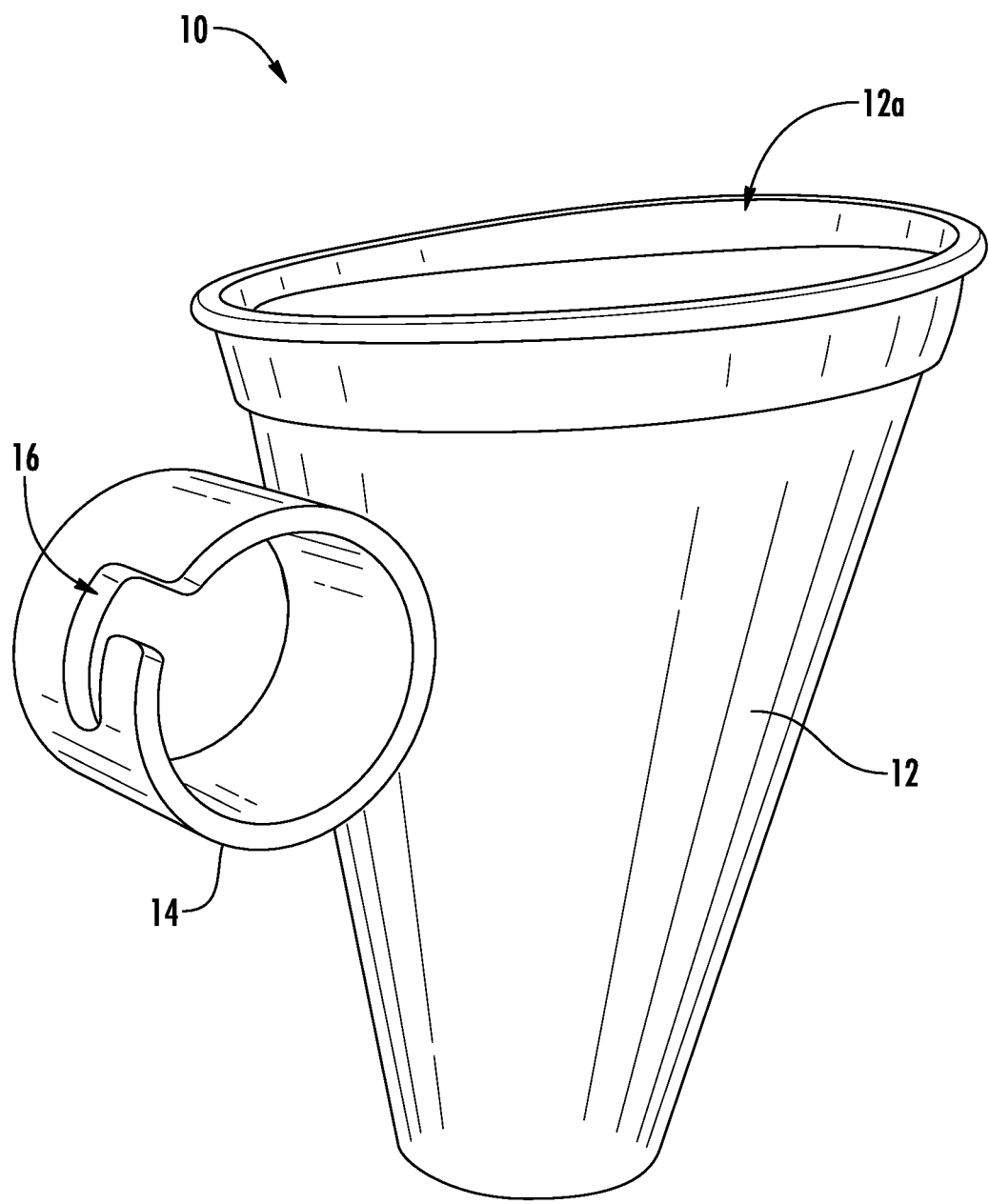
FIG. 1 is a perspective view of the funnel accessory according to the invention.
Figure 2:
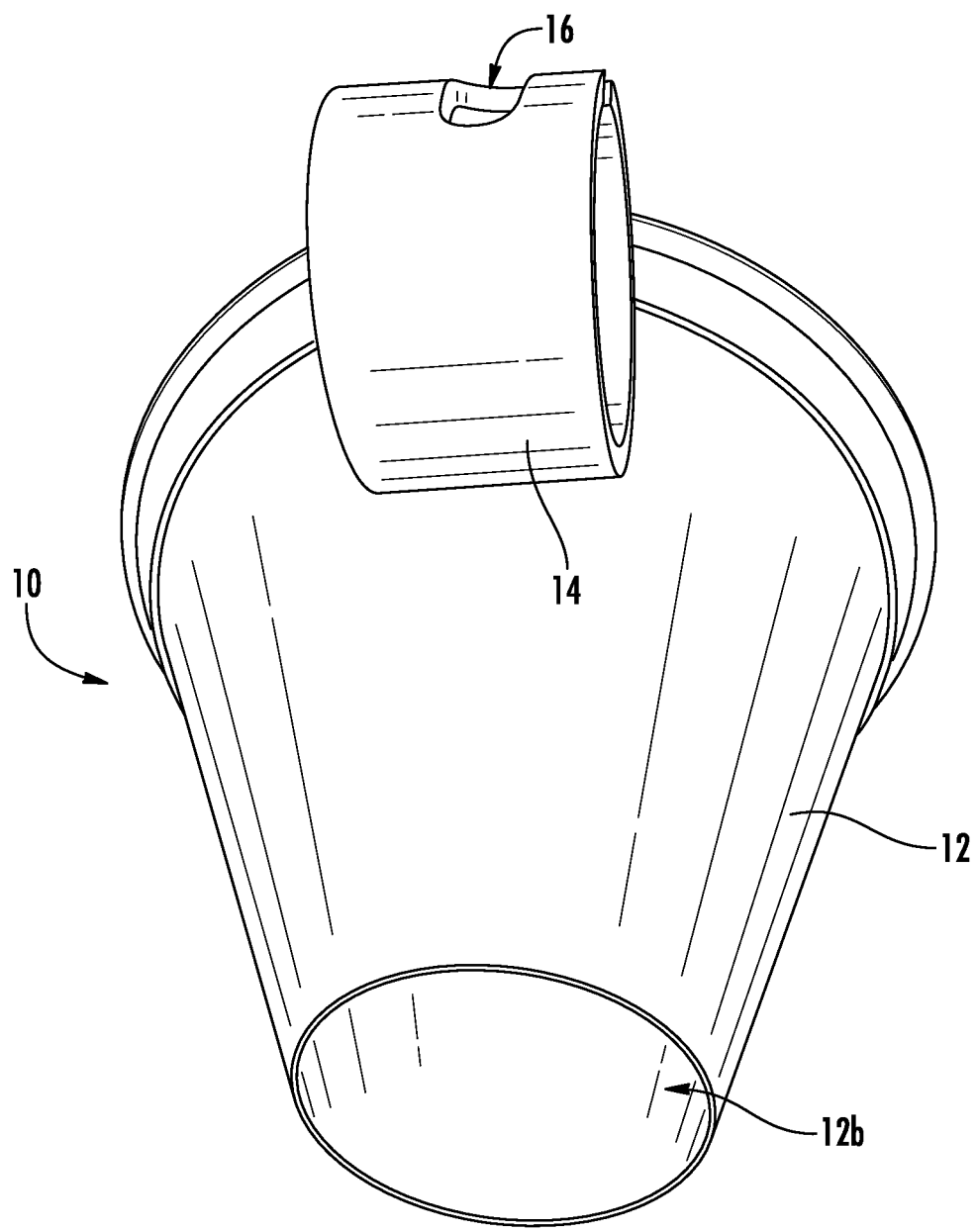
FIG. 2 is a bottom perspective view of the funnel accessory in FIG. 1.
Figure 3:
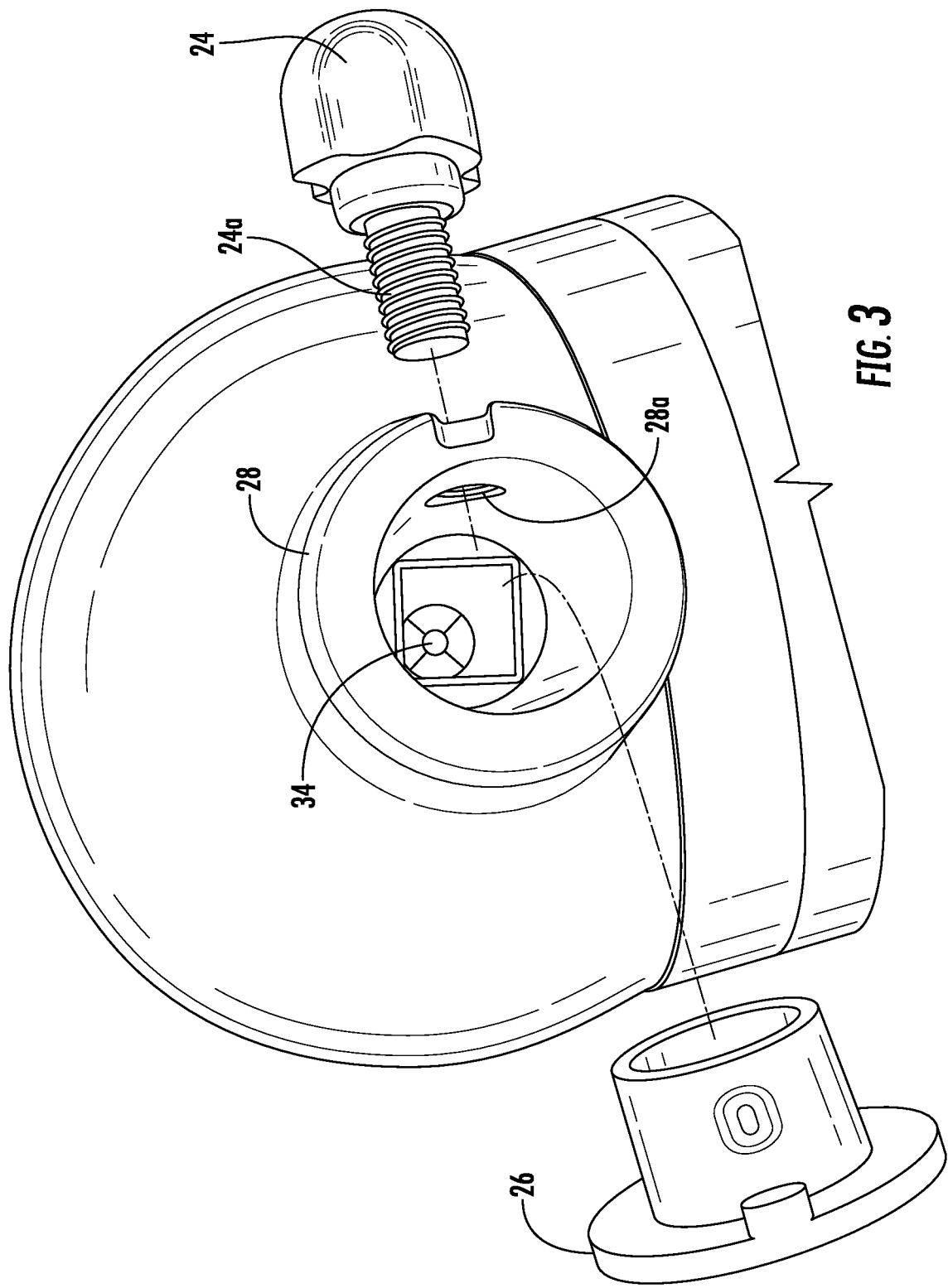
FIG. 3 is a perspective view of an accessory hub of a Kitchen Aid® brand stand mixer.
Figure 4:
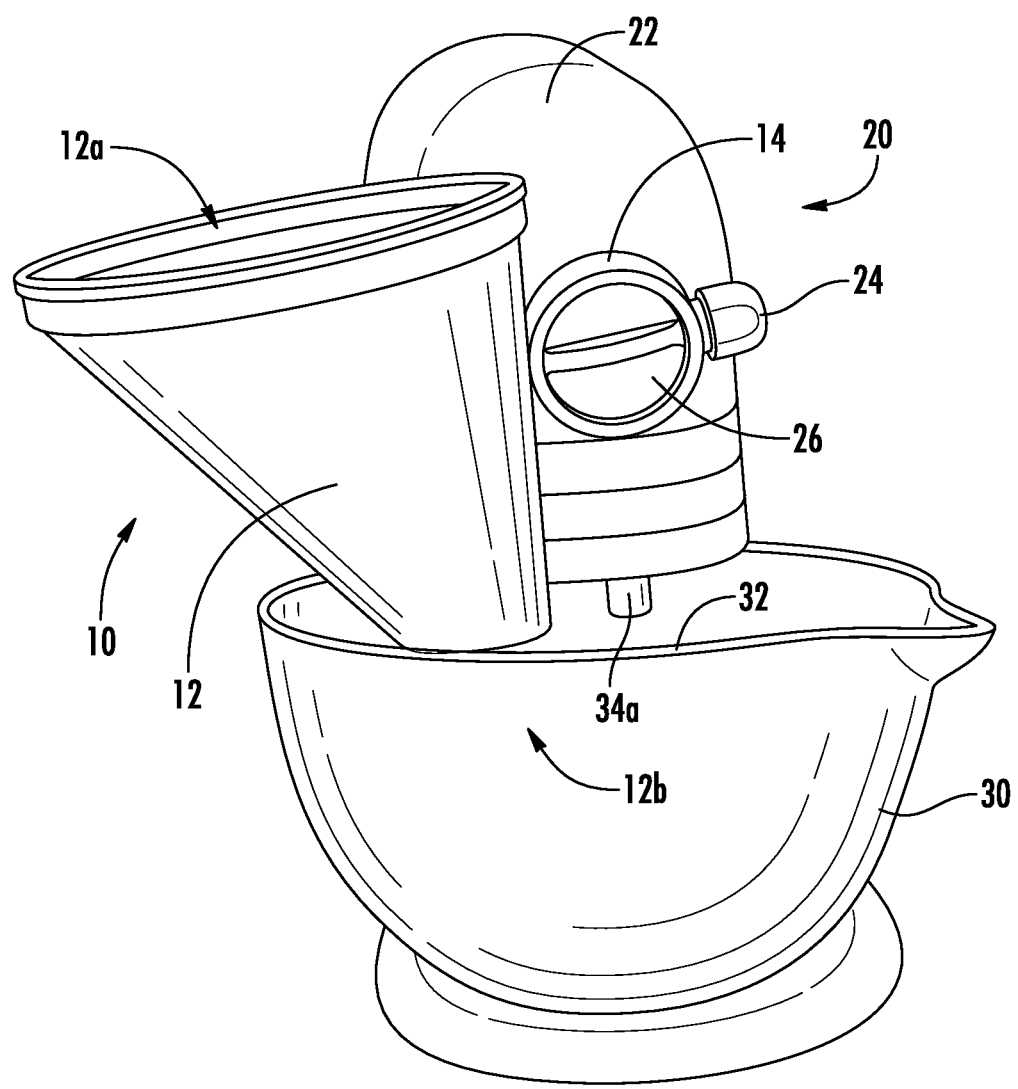
FIG. 4 is front view of the funnel accessory as it would appear affixed to the accessory hub.

The following is a list of reference labels used in the drawings to label components of different embodiments of the invention, and the names of the indicated components.
10 funnel accessory
12 funnel
12a top opening
12b bottom opening
14 mount
16 slot
18 mixer base or pedestal
20 stand mixer or mixer
22 motor head
24 thumb screw
24a threaded portion of thumb screw
26 cap
28 attachment hub or hub
28a aperture
30 mixing bowl
32 lip
34 front accessory shaft receiver
34a accessory mount
34b beater accessory or beater

DETAILED DESCRIPTION

Figure 5:
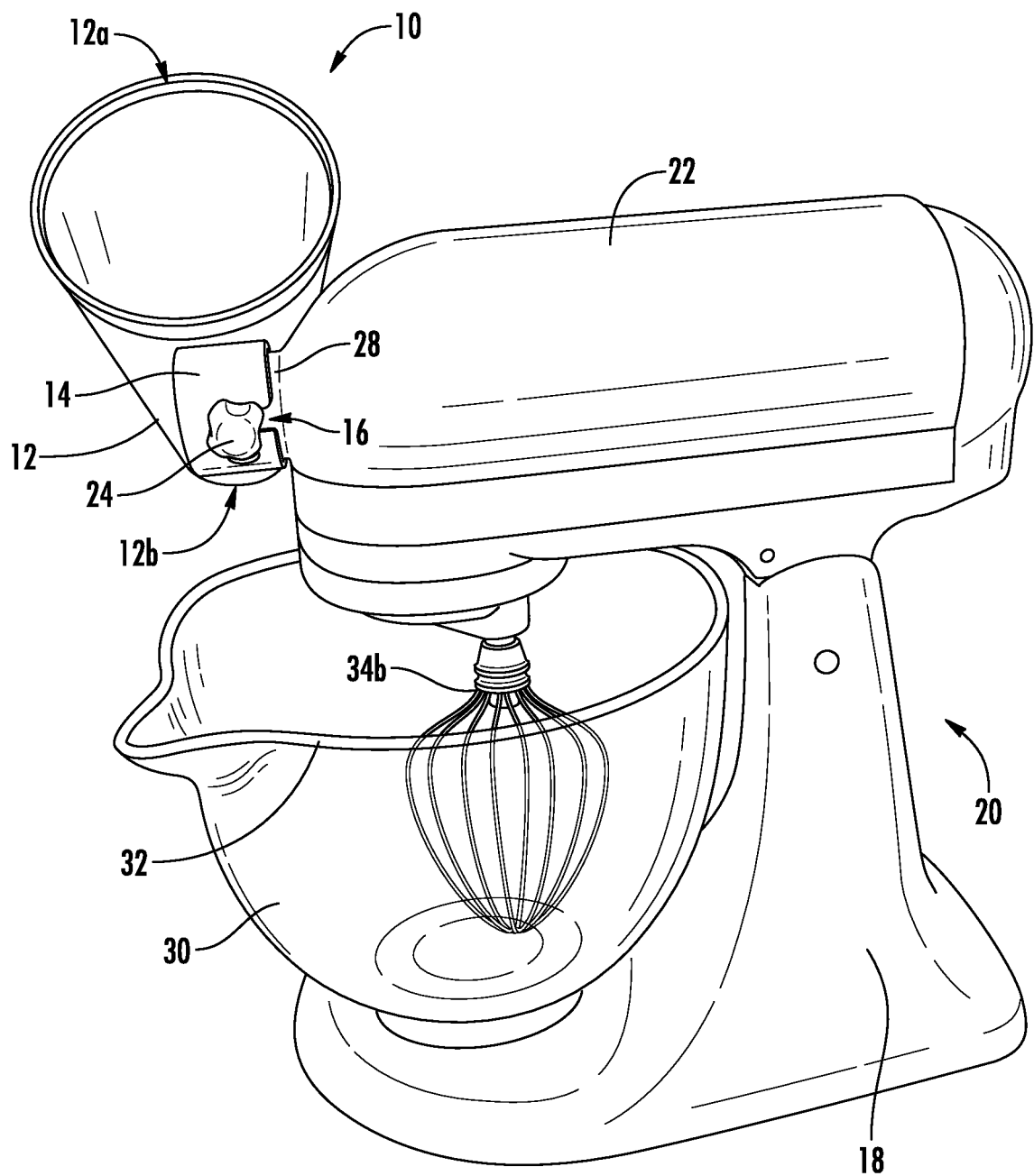
FIG. 5 is a side perspective view of the funnel accessory positioned onto an attachment knob of the accessory hub of the stand mixer, as shown from the attachment knob side of the stand mixer.
Figure 6:
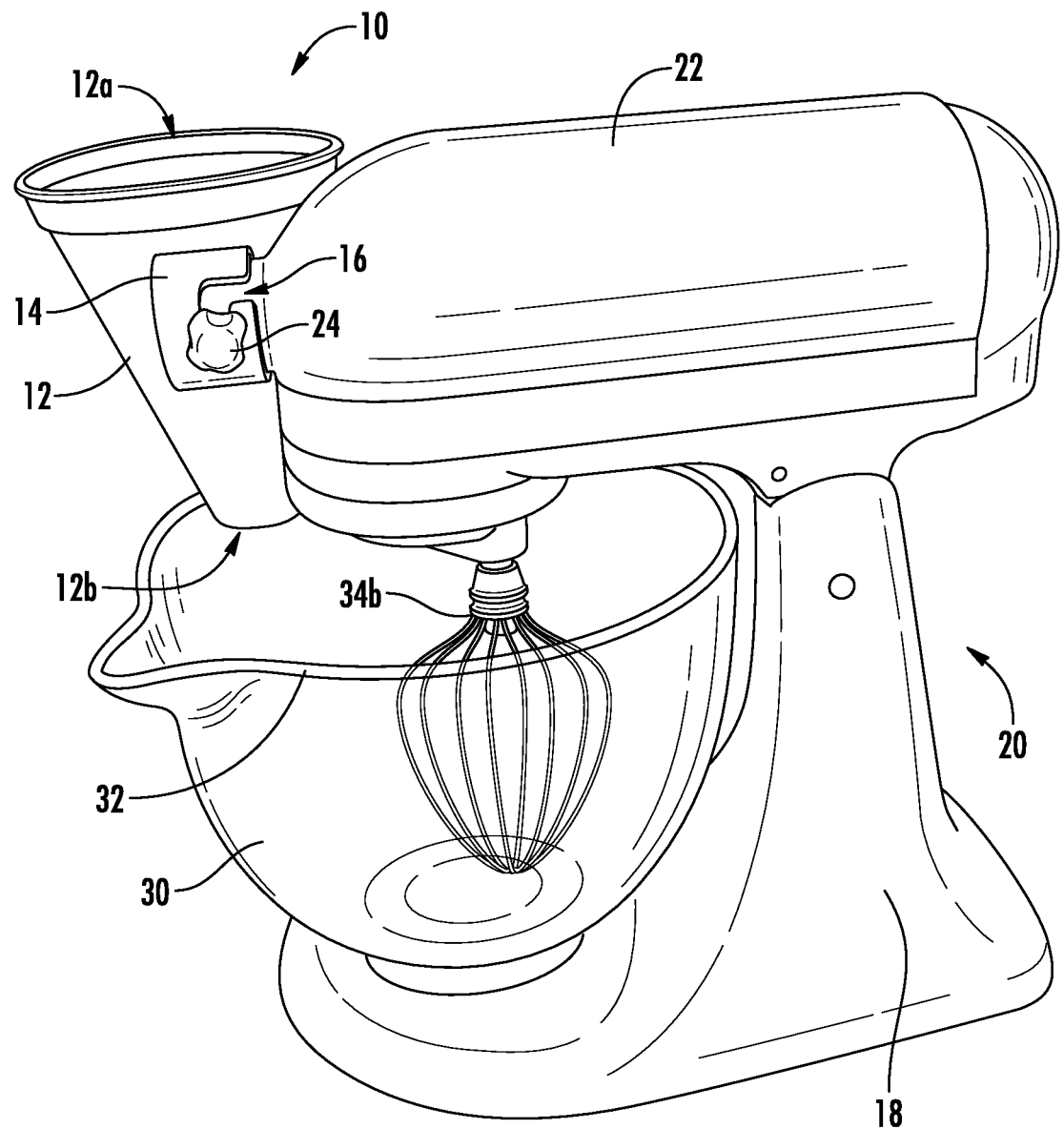
FIG. 6 is a side perspective view of the funnel accessory affixed to the attachment knob of the accessory hub in an operational position ready to receive ingredients.

A funnel accessory 10 according to the invention is described in FIGS. 1-6 and is designed for use with a Kitchen Aid® brand stand mixer 20 described in FIGS. 5 and 6.

The mixer 20 features a motor head 22 housing a motor (not shown), a hub 28 protruding from a front of the motor head 22 having an accessory shaft receiver allowing the motor to turn an inserted shaft of an accessory attachment (not shown) inserted into the hub 28. The hub 28 is covered by a removable cap 26. A thumb screw 24 having a threaded portion 24a screws into an aperture 28a formed through an exterior wall of the hub. Turning the thumb screw 24 causes the threaded portion 24a thereof to move inside the hub interior space and apply pressure to the inserted shaft of the accessory attachment to secure the accessory attachment, and similarly, turning the thumb screw 24 in an opposing direction causes the threaded portion 24a to move outside of the hub interior space and allow removal of the inserted shaft of the accessory attachment. The motor head 22 is pivotably affixed to a base or pedestal 18 of the mixer 20, and allows the motor head 22 to tilt away from the bowl 30 so as to allow access to a mixer accessory mount 34a, upon which a beater 34b is removably mounted. While the motor head 22 is tilted, a mixing bowl 30 is positioned onto the pedestal 18 of the mixer 20, and when the motor head with the mounted beater 34b is tilted downwards, the beater 34b is now positioned inside the bowl 30.

Turning now to the Figures, the funnel accessory 10 has a funnel body or funnel 12 with a top opening 12a and a relatively smaller bottom opening 12b, with a continuous side wall of the funnel 12 tapering down from the top opening 12a to the bottom opening 12b. In the Figures, a representative funnel accessory is shown sized for use with an Artisan® branded stand mixer, and the inventor wishes to stress that the dimensions provided in this disclosure are adjusted as required to fit individual stand mixers. In the Figures, the top opening 12a is about 4.75 inches in diameter, the bottom opening 12b is about 1.63 inches in diameter, with the funnel height measured vertically from top to bottom openings approximately 5.25 inches and a tapering portion of the side wall measuring about 6.4 inches long. "Funnel" is used here to denote any shape that has a relatively wider top opening for receiving ingredients such as flour, as compared to the bottom opening, with the side wall capable of having a variety of different shapes and additional angles but where at least a portion of the side wall slopes generally downwards from the top opening to the bottom opening. A mount 14 is affixed to an exterior of the side wall of the funnel 12 and is sized and shaped to fit over a circumference of an exterior wall of the hub 28 of the mixer 20. In the Figures, the mount 14 is annular, matching an exterior wall shape of the hub 28, and with a hub-receiving opening having an approximate inside diameter of 1.5 inches, slightly larger than that of the hub 28 so as to allow the mount 14 to mate with the hub by sliding the hub-receiving opening the exterior wall. It should be noted that a different exterior shape for the hub 28, for instance a hexagonal shape, would logically require a complementary-shaped hub-receiving opening, and thus the annular shape of the mount 14 is determined by the exterior wall shape of the hub 28. The mount 14 can be formed as a separate piece removably or permanently affixed to the funnel 12 or alternatively the funnel and mount are formed as an integral unit. The mount 14 is further formed with a slot 16, shown in the Figures as an L-shaped channel sized and shaped to receive the threaded portion 24a of the thumb screw 24, and in the Figures specifically is approximately 0.35 inches wide to accommodate the thumb screw 24 having a 5/16-18 thread size.

To attach the funnel accessory 10 to the mixer, the slot 16 is aligned with the threaded portion 24a of the thumb screw 24 and pushed over the exterior wall of the hub 28. The threaded portion 24a enters the slot 16 and the mount 14 is then further turns counterclockwise so the threaded portion 24a moves further into the slot 16 so as to move through the entire "L" shape of the slot 16. A weight of the funnel 12 itself will naturally move the threaded portion 24a further into the slot 16, locking the funnel accessory 10 onto the hub 28. It should be noted that this "L" shape of the slot 16 is ideally for an annular mount (as shown in the Figures) which corresponds with the annular shape of the hub 28; if the hub exterior shape changes, for instance, to a hexagonal shape, the slot 16 will not be "L" shaped but rather correspond with a straight channel to receive the thumb screw 24. The bottom opening 12b is positioned just below the rim 32 of the bowl 30, directing flour or other ingredients poured into the top opening 12a into the bowl's interior, with the side wall of the funnel 12 protecting the motor head itself from becoming dirty while ingredients are added. Mounting the funnel accessory 10 on the exterior wall of the hub 28 does not interfere with the front accessory shaft receiver 34 of the hub 28, although other OEM accessories such as meat grinders and apple peelers which attach to the shaft receiver 34 may or may not be capable of functioning while the funnel accessory 10 is mounted to the hub 28 based on space clearances, etc. The slot 16 allows for a secure positioning of the funnel accessory 10 and easy removal therefrom. The funnel 12 openings 12a 12b and total vertical height of the funnel is such that the bottom opening 12b can clear the lip 32 of the bowl 30 when the motor head 22 is tilted upwards to allow removal of the beater 34b without the need to remove the funnel accessory 10. Measurements for the representative funnel accessory 10 provided herein are for a use with the Artisan® model of Kitchen Aid® brand stand mixers, and hence dimensions for the total funnel height, mount inside diameter, and slot diameters are logically adjusted to other stand mixer models and sizes, so long as the bottom opening 12b continues to be positioned so as to be able to clear the lip of the bowl 30 at all times, regardless of the position of the motor head 22. In the Figures, the bottom opening 12b is shown extending approximately 0.25 inches below the lip 32 and into the bowl 30. A relatively tall stand mixer commonly can accommodate bowls of a variety of sizes and thus the vertical height of the funnel 12 can be adjusted accordingly where the bottom opening 12b is positioned as close to the mouth of the bowl and even extending into the bowl, but without interfering with an ability to tilt the motor head away from the bowl while the funnel accessory 10 is still attached. The funnel accessory 10, now securely affixed to the hub 28, allows the cook to simultaneously run the mixer, control the mixer's beater speed and introduce ingredients into the mixing bowl 30 neatly and efficiently. When the cook is finished using the mixer, the funnel accessory 10 is quickly and easily removed for cleaning, and can be conveniently stored mounted on the hub 28.

The funnel 12 is typically made of food-grade plastic or another rigid material such as metal, however the inventor believes that other suitable materials include flexible silicone or combinations of rigid and flexible materials can be used to make the funnel 12. Use of flexible silicone or other flexible materials additionally allows the funnel 12 to compactly store. The inventor also notes that the funnel 12 could also be bipartite or telescoping in design and the parts slid or snapped into place prior to use. If the bottom opening 12b of the funnel 12 is made of a flexible material, it is also possible to make the bottom opening 12b extend inside the bowl 30 below the lip 32 as the flexible bottom opening 12b can then deform and clear the lip 32 of the bowl without damaging either part.

It is to be understood that the above-described arrangements are only illustrative of the application of the principles of the present invention. Numerous modifications and alternative arrangements may be devised by those skilled in the art without departing from the scope of the present invention.

What is claimed is:

1. A funnel accessory for a stand mixer, comprising:
   a funnel body having an exterior side wall, a too opening and a bottom opening;
   a mount having a hub-receiving opening and a continuous wall, the mount affixed to the exterior side wall of the funnel body; and
   a slot formed into the mount,
   wherein the hub-receiving opening is sized and shaped to couple with an exterior wall of a hub protruding from a motor head of the stand mixer,
   wherein the slot is sized and shaped to receive a thumb screw of the stand mixer mating with an aperture formed into the hub, and
   wherein the hub-receiving opening of the mount is oriented so as to be perpendicular to the top opening of the funnel,
   whereby the funnel accessory is coupled to the hub by aligning the slot with the thumb screw and pushing the mount so that the hub-receiving opening receives the exterior wall of the protruding hub and the thumb screw slides inside the slot.

2. The funnel accessory in claim 1, wherein the slot is an L-shaped slot.

3. The funnel accessory in claim 1, wherein the funnel body is further comprised of a predetermined vertical height measurement such that the bottom opening is positioned no more than about 0.25 inches below a lip of a mixing bowl resting on a pedestal of the stand mixer.

4. The funnel accessory in claim 1, wherein the slot is about 0.35 inches wide and the thumb screw has a 5/16-18 thread size.

5. The funnel accessory in claim 1, wherein an interior side of the continuous wall of the mount is annular.

6. The funnel accessory in claim 1, wherein the slot is defined by a pair of parallel walls.

7. The funnel accessory in claim 1, wherein the funnel is made of at least one of a food grade plastic and silicone.

\* \* \* \* \*